(12) United States Patent
Tseng et al.

(10) Patent No.: US 6,816,918 B2
(45) Date of Patent: Nov. 9, 2004

(54) FLEXIBLE APPARATUS FOR SETTING CONFIGURATIONS USING AN EEPROM

(75) Inventors: Weu-Cheng Tseng, Chutang (TW); Hsin-Min Yeh, Yung-He (TW)

(73) Assignee: Broadcom Corporation, Irvine, CA (US)

( * ) Notice: Subject to any disclaimer, the term of this patent is extended or adjusted under 35 U.S.C. 154(b) by 276 days.

(21) Appl. No.: 10/119,074

(22) Filed: Apr. 10, 2002

(65) Prior Publication Data

US 2003/0196005 A1 Oct. 16, 2003

(51) Int. Cl.[7] .............................................. G06F 3/00
(52) U.S. Cl. ............................ 710/8; 710/10; 710/13; 710/104; 709/220; 709/221; 709/222; 713/1; 713/2; 713/100
(58) Field of Search .......................... 710/8, 10, 13, 710/104; 709/220–222; 713/1, 2, 100

(56) References Cited

U.S. PATENT DOCUMENTS

| | | | |
|---|---|---|---|
| 5,423,015 A | 6/1995 | Chung | |
| 5,644,784 A | 7/1997 | Peek | |
| 5,727,126 A | 3/1998 | Eichfeld et al. | |
| 5,727,207 A | * 3/1998 | Gates et al. | ................... 713/1 |
| 5,781,796 A | * 7/1998 | Lee | ................ 710/8 |
| 5,794,033 A | 8/1998 | Aldebert et al. | |
| 5,909,686 A | 6/1999 | Muller et al. | |
| 6,061,351 A | 5/2000 | Erimli et al. | |
| 6,199,192 B1 | 3/2001 | Marquez et al. | |
| 6,292,848 B1 | * 9/2001 | Plyler et al. | ................... 710/8 |
| 6,407,960 B1 | * 6/2002 | Egbert et al. | .......... 365/230.04 |

FOREIGN PATENT DOCUMENTS

WO          99/00936          1/1999

OTHER PUBLICATIONS

Ian Page, "Reconfigurable Processor Architectures," Microprocessors and Microsystems, IPC Business Press Ltd., London, Great Britain, vol. 20, No. 3, May 1, 1996, p. 185–196.

* cited by examiner

*Primary Examiner*—Jeffrey Gaffin
*Assistant Examiner*—Eron Sorrell
(74) *Attorney, Agent, or Firm*—Squire, Sanders & Dempsey LLP

(57) ABSTRACT

A method for flexibly configuring default values of a network device through an EEPROM interface is disclosed. A header is received from an EEPROM through the EEPROM interface and it is determined from the header whether any default value of the network device should be updated, and if any, how many should be updated. At least one configuration instruction is fetched from the EEPROM when it is determined that the network device should be updated. The at least one configuration instruction is interpreted and a register default value of the default values corresponding to the interpreted at least one configuration instruction is changed.

12 Claims, 3 Drawing Sheets

Downloadable Register

FLEXIBLE APPARATUS FOR SETTING CONFIGURATIONS USING AN EEPROM

BACKGROUND OF THE INVENTION

1. Field of the Invention

The present invention relates to a method and apparatus of selectively configuring a network device using an Electrically Erasable Programmable Read Only Memory (EEPROM). More specifically, the method and apparatus allows for the use of dynamic configuration settings in the EEPROM interface that increases flexibility, has fewer limitations and is a low cost alternative.

2. Description of Related Art

Many types of network devices are necessary to allow an network to function properly. These network devices are composed of chips, with these chips allowing for the control and monitoring of data through the network device. Chip vendors may pre-set some register default values inside a network device, such as a switch/hub chip, to provide a low cost switch and hub application. That means it is not necessary for system integrators to change the internal register default values to build a workable system. The preconfigured chips allow for the network devices to be setup and to function quickly for a majority of system integrators.

Sometimes, these pre-set register default values might not suitable for some system integrators. Chip vendors should provide some methods so that system integrators can change some register values instead of using default values. Some chip vendors will provide a microprocessor interface (SPI, I2C, or PCI) to allow system integrators to change all write-able register. However, built-in microprocessors on the chip boards increase system costs and may not be needed by many customers.

Another alternative method to allow users to change the default values is to provide an Electrically Eraseable Programmable Read Only Memory (EEPROM) interface. With an EEPROM interface, a system integrator can change some register default values using a very low cost EEPROM. Most of chip vendors have provided an EEPROM interface for a low cost switch and hub application.

FIG. 1 provides as an example of a low cost pre-programmed EEPROM that is used to change some default values of a network switch/hub chip. When the external control signal (RESET) goes to in-active, network switch/hub chip start to change its some register default values via downloading the contents of EEPROM. And then network switch/hub chip start its normal operation after the download phase had been finished.

When the RESET signal goes to in-active, network switch/hub chip start to fetch data from external EEPROM automatically. Most of the network switch/hub chips will fetch data from EEPROM address 00h (the first entry), and fetch the other data in sequence. In order to change some register default values or set chip configuration, the chip vendor will provide a register set (a part of chip register file) which are downloadable from EEPROM. Each entry of EEPROM is pre-defined and will directly map to one (or some) entry of register set inside network switch/hub chip as described in FIG. 2.

However, in this kind of scenario, two major drawbacks may occur. First, different system integrators may want to change different registers. And it is not necessary for system integrators to configure all downloaded register. However, even if system integrators only want to configure some of chip downloadable registers, it is still necessary to fill all the contents of downloadable register set into EEPROM. Secondly, some register default values of network switch/hub chip are change-able via microprocessor interface, but they are not downloadable via EEPROM. In this case, the only way for system integrator to act is to build a microprocessor on his PCB instead of using a very low cost EEPROM.

Thus, there is a need for a mechanism and a process to be used with a network device that allows for a system integrator to make changes to default settings of the network device that is not costly or cumbersome. Additionally, there is also a need such a mechanism to change only certain defaults on a network device without the limitations imposed by the prior art processes and devices.

SUMMARY OF THE INVENTION

It is an object of this invention to overcome the drawbacks of the above-described conventional network devices and methods. The present invention provides for a new approach for chip vendors to provide system integrators a dynamic configuration using low cost EEPROM. With this approach, system integrators will have flexibility to change the default values of all configure-able registers inside a network device, such as a switch/hub chip.

According to one aspect of this invention, a method for flexibly configuring default values of a network device through an EEPROM interface. A header is received from an EEPROM through the EEPROM interface and it is determined from the header whether any default value of the network device should be updated. At least one configuration instruction is fetched from the EEPROM when it is determined that the network device should be updated. The at least one configuration instruction is interpreted and a register default value of the default values corresponding to the interpreted at least one configuration instruction is changed.

Additionally, the method can include monitoring a reset signal to determine whether the default values of the network device should be updated. In addition, the method can also determine the number of default values of the network device need to be updated. Also, in determining whether any default value of the network device should be updated includes determining a key value from the header and comparing the key value with a magic number pre-defined inside network device to determine whether any default value of the network device should be updated. The at least one configuration instruction can also be a plurality of configuration instructions and the step of fetching at least one configuration instruction from the EEPROM can be repeated until all of the plurality of configuration instructions have been fetched.

In another aspect of the invention, a network device, having default values, that is flexibly configurable, is also disclosed. The device includes an EEPROM interface, a register file containing the default values for the network device and a configuration instruction interpreter. The EEPROM interface is configured to receive configuration instructions, with each configuration instruction of the configuration instructions being composed of an address index and a corresponding value and wherein the configuration instruction interpreter is configured to interpret the received configuration instructions such that the corresponding values are mapped corresponding default values of the register file.

Also, the network device may have a configuration instruction interpreter that is configured to monitor a reset signal to determine if the default values should be updated. The configuration instruction interpreter may also be configured to receive a header from the EEPROM interface containing a key value from and configured to compare the key value with a pre-defined magic number to determine whether any default value of the default values should be updated. Similarly, the configuration instruction interpreter may be configured to repeatedly fetch configuration instructions from the EEPROM until all of the configuration instructions have been fetched.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
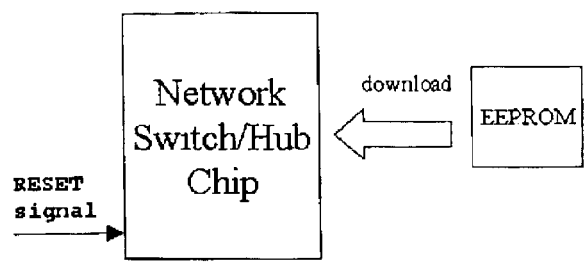
FIG. 1 illustrates a network device that interfaces with an EEPROM.
Figure 2:
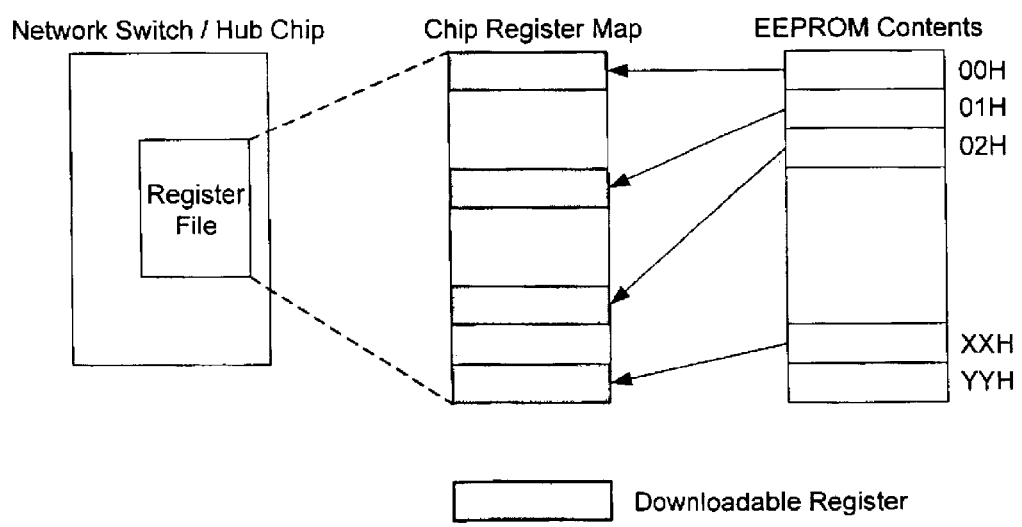
FIG. 2 illustrates the how the contents of the EEPROM map into register file using the chip register map.
Figure 3:
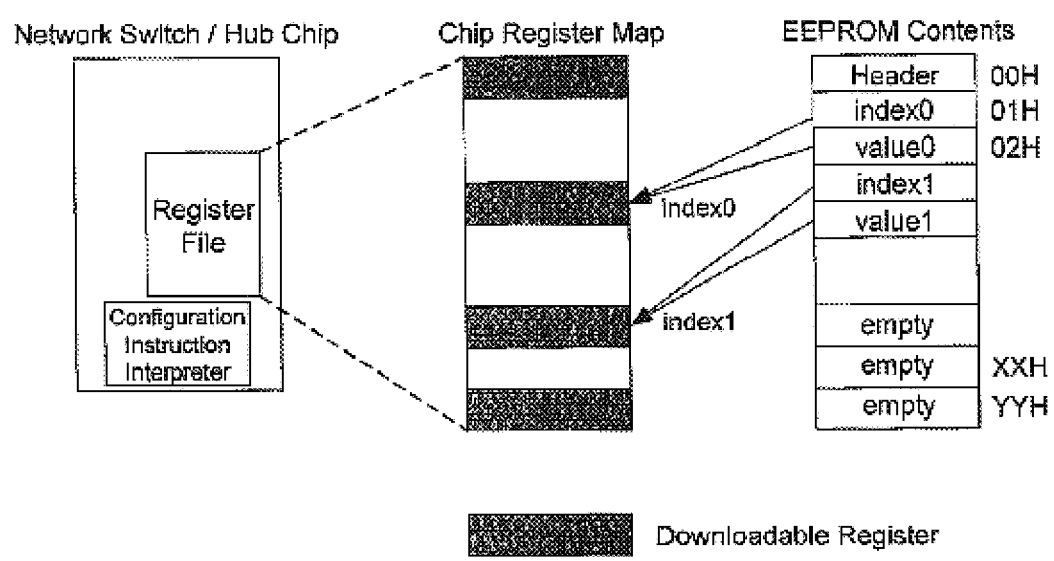
FIG. 3 illustrates an embodiment of the present invention where the EEPROM has a dynamic configuration.

At the heart of the present invention is the change in the contents of the EEPROM to a set of configuration instructions instead of configuration values only. Each configuration instruction is composed of address index and its corresponding desired value. An in-direct mapping mechanism is used to map EEPROM contents to their corresponding registers inside network switch/hub chip instead of original direct mapping method. Besides, a header, encapsulated with a specific key value and total number of configuration instructions, should be filled in the first entry of EEPROM content. This header is designed as an identifier during EEPROM download cycle. One embodiment of the present invention is illustrated in FIG. 3.

To achieve this flexible configuration apparatus, network switch/hub chip vendor should build-in a circuit (called Configuration Instruction Interpreter, CII) inside the chip to interpret configuration instruction. When RESET signal goes to in-active, the CII of network switch/hub chip start to fetch header (the first entry) from external EEPROM automatically, then the key is obtained. If the key value is not matched with the magic number pre-defined inside network switch/hub chip, it indicates that it is not necessary to change any chip default value, and download sequence might be skipped. While key is match, CII continuously fetches configuration instruction from EEPROM, and changes the corresponding (defined in address index of configuration instruction) register default value to the desired value by interpreting instruction. This process will be repeated until all instruction download completely. Additionally, since the number of default values needing to be updated is determined from the start, the time needed to perform the updated is less than the equivalent updating performed in the prior art methods and systems.

Figure 4:
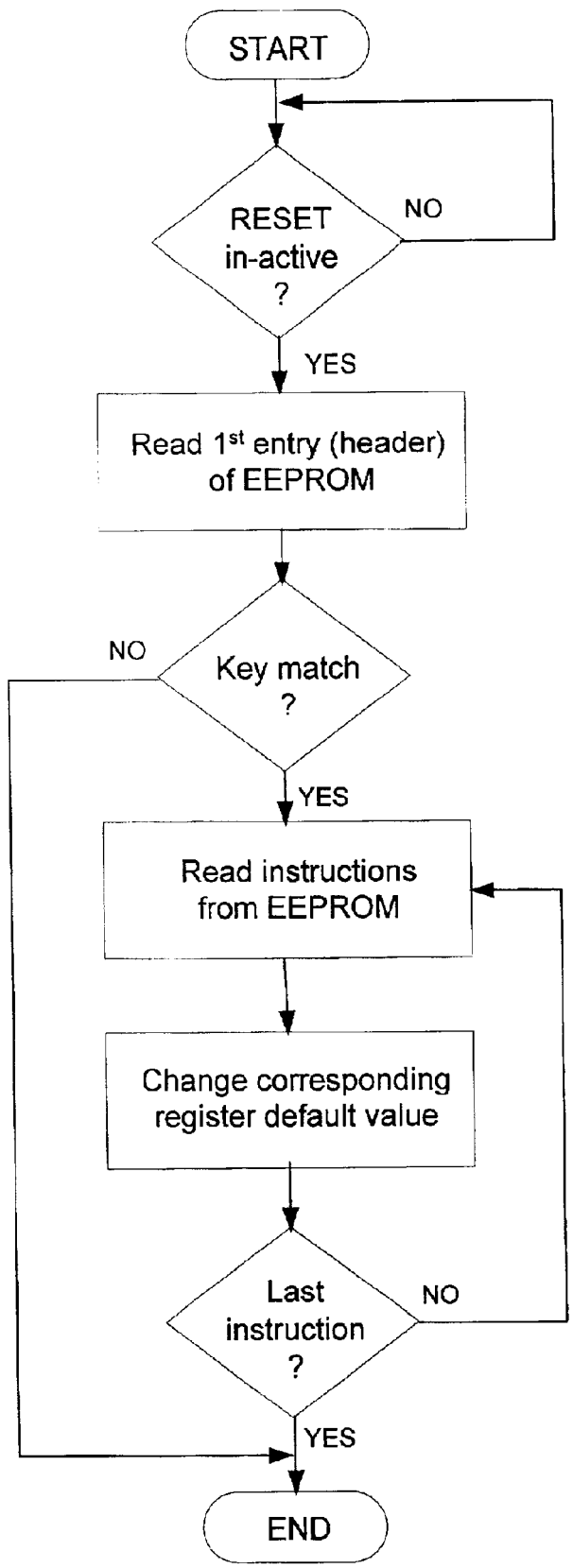
FIG. 4 illustrates the operation of the system of the present invention.

This process is illustrated in FIG. 4. The process continually checks to see if the RESET signal is set to in-active. Once the RESET signal is in-active, the header of the EEPROM is read. A key is determined and compared with a magic number inside the chip. If there is a match, then instructions are read from the EEPROM and the corresponding register default value is changed. If that instruction just read was the last, then the process ends. If it was not the last, then the next instruction is read from the EEPROM and the default values of the corresponding register are changed.

With this new configuration instruction of EEPROM content, it is not necessary for chip vendor to provide a pre-defined downloadable set. And system integrator could use a very cost EEPROM to change any downloadable register default value. System integrator could decide which registers he wants to change the default values without too much limitation. Additionally, the system integrator also could decide how many registers he wants to change. Such that, less capacity EEPROM could be used due to few register default values changed.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method for flexibly configuring default values of a network device through an EEPROM interface, comprising:

receiving a header from an EEPROM through the EEPROM interface where the header provides information about a total number of configuration instructions in the EEPROM;

determining from the header whether any default value of the network device should be updated;

fetching at least one configuration instruction from the EEPROM when the determining step determines that the network device should be updated;

interpreting said at least one configuration instruction; and changing a register default value of said default values corresponding to said interpreted at least one configuration instruction.

2. The method according to claim 1, wherein said method further comprises monitoring a reset signal to determine whether the default values of the network device should be updated.

3. The method according to claim 1, wherein said step of determining from the header whether any default value of the network device should be updated comprises determining from the header a number of the default values of the network device that should be updated.

4. The method according to claim 3, wherein said step of fetching at least one configuration instruction from the EEPROM comprises fetching a number of configuration instructions from the EEPROM equal to the number of the default values of the network device that should be updated.

5. The method according to claim 1, wherein said step of determining from the header whether any default value of the network device should be updated comprises, determining a key value from said header and comparing said key value with a magic number pre-defined inside network device to determine whether any default value of the network device should be updated.

6. The method according to claim 1, wherein said at least one configuration instruction comprises a plurality of configuration instructions and the step of fetching at least one configuration instruction from the EEPROM is repeated until all of the plurality of configuration instructions have been fetched.

7. A network device, having default values, that is flexibly configurable, comprising:
an EEPROM interface;
a register file containing the default values for the network device; and
a configuration instruction interpreter;
wherein the EEPROM interface is configured to receive configuration instructions, with each configuration instruction of said configuration instructions being composed of an address index and a corresponding value and wherein the configuration instruction interpreter is configured to interpret the received configuration instructions such that the corresponding values are mapped corresponding default values of the register file; and
wherein the EEPROM interface is configured to receive a header from the EEPROM, where the header provides information about a total number of the configuration instructions in the EEPROM, and is configured to determine whether any default value of the network device should be updated.

8. The network device according to claim 7, wherein said configuration instruction interpreter is configured to monitor a reset signal to determine if the default values should be updated.

9. The network device according to claim 7, wherein said configuration instruction interpreter is configured to determine from the header a number of the default values of the network device that should be updated.

10. The network device according to claim 9, wherein said configuration instruction interpreter is configured to fetch a number of configuration instructions from the EEPROM equal to the number of the default values of the network device that should be updated.

11. The network device according to claim 7, wherein the configuration instruction interpreter is configured to receive a header from the EEPROM interface containing a key value from and configured to compare said key value with a pre-defined magic number to determine whether any default value of said default values should be updated.

12. The network device according to claim 7, wherein the configuration instruction interpreter is configured to repeatedly fetch configuration instructions from the EEPROM until all of the configuration instructions have been fetched.

* * * * *